ered therein.
United States Patent

[11] 3,633,546

| [72] | Inventor | Alvin Guttag<br>Bethesda, Md. |
|---|---|---|
| [21] | Appl. No. | 30,447 |
| [22] | Filed | Apr. 21, 1970 |
| [45] | Patented | Jan. 11, 1972 |
| [73] | Assignee | National Patent Development Corporation<br>New York, N.Y. |

[54] ALGAE GROWTH-PREVENTING CONTAINER
9 Claims, 3 Drawing Figs.

[52] U.S. Cl................................................. 119/5,
 4/172, 260/DIG. 9
[51] Int. Cl................................................. A01k 64/00
[50] Field of Search............................... 119/5;
 4/172, 172.19; 106/15 AF; 71/1 D; 260/DIG. 29

[56] References Cited
UNITED STATES PATENTS

| 3,130,124 | 4/1964 | Ferris et al.............. | 71/1 AD UX |
| 2,579,610 | 12/1951 | Pitre et al. ............. | 260/DIG. 29 |
| 3,258,326 | 6/1966 | Robussier................ | 71/2.5 |
| 3,426,473 | 2/1969 | Cardarelli et al. ....... | 106/15 X |

*Primary Examiner*—Hugh R. Chamblee
*Attorney*—Cushman, Darby & Cushman

ABSTRACT: A container for water in which vertebrate animals swim is given an internal coating of a hydrophilic polymer having an algicide impregnated or adsorbed therein. This prevents the algae from growing on the container and is especially valuable in preserving the transparency of glass or clear plastic aquariums.

PATENTED JAN 11 1972

3,633,546

INVENTOR
ALVIN GUTTAG

BY Cushman, Darby & Cushman
ATTORNEYS

ALGAE GROWTH-PREVENTING CONTAINER

The present invention relates to the internal coating of containers for water in which vertebrate animals swim.

In aquariums such as are used in homes, museums and elsewhere for containing and displaying tropical or other fish algae form on the inner surface of the glass or clear plastic walls of the aquarium, note Roesel U.S. Pat. No. 3,208,090. This now only detracts form the transparency of the walls but gives a dirty, murky appearance, materially detracting from the normally pleasant attractiveness of the aquarium and fish therein. Algae also deposit or grow as a greenish scum or slime on the walls of swimming pools or outdoor fishponds.

It is an object of the present invention to repress the development of algae on the walls of containers for water in which vertebrate animals swim.

A more specific object is to preserve the transparency of glass or clear plastic walls of aquariums for fish or the like by preventing the growth of algae on the walls.

It has now been found that these objects can be attained by applying to the inner wall or walls of the container for the vertebrate swimming animals a coating of a hydrophilic, water swellable, water insoluble polymer impregnated with (or having adsorbed therein) an algicide. Due to its hydrophilic nature, the polymer gradually releases the algicide which prevents the algae from growing on the coated wall of the container. Thus the wall is kept clean of algae. The invention is particularly useful in the case of aquariums having a transparent wall since due to the transparency of the hydrophilic polymer prevention of the growth of algae causes the retention of the transparency of the wall to be retained indefinitely, i.e., for a period of a year or more without the necessity of cleaning the tank.

As used in the present specification and claims, the terms wall and wall means are intended to include the bottom of the container, the inside of which can be similarly coated to the sidewall or walls with like advantageous effect.

The hydrophilic polymers of the present invention are to be distinguished from the conventional hydrophobic acrylic resins such as polymethyl methacrylate, see Overman U.S. Pat. No. 3,113,555, which are conventionally employed as transparent walls for aquariums. These conventional acrylic resins are not hydrophilic, not water swellable and are unsuited for releasing algicides. It is essential for proper algicide release to employ hydrophilic, water insoluble polymers as the entrapping agent.

The hydrophilic polymer impregnated with algicide can be applied to a container for an aquatic animal made of virtually any construction. Thus it can be applied to a swimming or wading pool (either of which can also serve as an outdoor fishpond), having an inner wall of precast concrete, molded polyester impregnated glass fibers (e.g., ethylene glycol adipate-maleate-styrene impregnated glass fibers), e.g., see Collins U.S. Pat. No. 3,208,084, a waterproof vinyl chloride resin or saran resin inner liner, or the like. As stated, however, the invention is especially adapted to aquarium for fish or a live lobster tank having a transparent wall of glass or clear plastic e.g., polymethyl methacrylate, oriented polystyrene, oriented polyethylene, oriented polypropylene, oriented polyvinyl chloride, etc.

The preferred hydrophilic polymers are themselves clear and transparent. Thus there can be employed hydrophilic monomers such as a hydroxy lower alkyl acrylate or methacrylate or hydroxy lower alkoxy lower alkyl acrylate or methacrylate, e.g., 2-hydroxyethyl acrylate, 2-hydroxyethyl methacrylate, diethylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate and dipropylene glycol monoacrylate. The most preferred monomers are the hydroxyalkyl acrylates and methacrylates, particularly 2-hydroxyethyl methacrylate.

There can also be employed polymers of acrylamide, methacrylamide, N-alkyl substituted acrylamide and methacrylamide such as N-propylacrylamide, N-isopropyl acrylamide, N-isopropyl methacrylamide, N-propyl methacrylamide, N-butyl acrylamide, N-methyl acrylamide and N-methyl methacrylamide, diacetone acrylamide, N-(2-hydroxyethyl) acrylamide and N-(2-hydroxyethyl) methacrylamide.

Likewise, there can be employed copolymers of these monomers with each other or with other copolymerizable monomers. In fact, if the hydrophilic monomer gives a product which is water soluble, e.g., polyacrylamide, it is necessary to employ a copolymerizable monomer to render it only water swellable rather than water soluble. The copolymerizable monomer can be used in an amount of 0.05 to 50 percent. Preferably, comonomers include methyl acrylate, ethyl acrylate, isopropyl acrylate, propyl acrylate, butyl acrylate, sec. butyl acrylate, pentyl acrylate, 2-ethylhexyl acrylate, methyl methacrylate, ethyl methacrylate, propyl methacrylate, isopropyl methacrylate, butyl methacrylate, sec. butyl methacrylate, pentyl methacrylate, lower alkoxyethyl acrylates and methacrylates, e.g. methoxyethyl acrylate, methoxyethyl methacrylate, ethoxyethyl acrylate and ethoxyethyl methacrylate, triethylene glycol acrylate, triethylene glycol methacrylate, glycerol monoacrylate and glycerol monomethacrylate. The copolymerizable monomer should not be used in an amount sufficient to impair the hydrophilic properties.

There can also be used unsaturated amines, p-aminostyrene, o-aminostyrene, 2-amino-4-vinyltolvene, alkylamino alkyl acrylates and methacrylates, e.g., diethylaminoethyl acrylate, diethylaminoethyl methacrylate, dimethylaminoethyl acrylate, dimethylaminoethyl methacrylate, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinyl pyridine, 4-vinyl pyridine, 2-ethyl-5-vinylpyridine, dimethylamino propyl acrylate, dimethylamino propyl methacrylate, dipropylaminoethyl acrylate, dipropylaminoethyl methacrylate, di-n-butylaminoethyl acrylate, di-n-butylaminoethyl methacrylate, di-sec. butylaminoethyl acrylate, di-sec. butylaminoethyl methacrylate, dimethylaminoethyl vinyl ether, diethylaminoethyl vinyl sulfide, diethylaminoethyl vinyl ether, aminoethyl vinyl ether, aminoethyl vinyl sulfide, monomethylaminoethyl vinyl sulfide, monomethylaminoethyl vinyl ether, N-(gamma-monomethylamino) propyl acrylamide, N-(beta-monomethylamino) ethyl acrylamide, N-(beta-monomethylamino) ethyl methacrylamide, 10-aminodecyl vinyl ether, 8-aminoctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl) aminoethyl vinyl ether, N-cyclohexylaminoethyl vinyl ether, 2-(1,1,3,3-tetramethylbutylamino) ethyl methacrylate, N-t-butylamino-ethyl vinyl ether, N-methylamino-ethyl vinyl ether, N-2-ethylhexylaminoethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethylaminoethyl)-2-hydroxypropyl methacrylate, 2-aminoethyl acrylate, 2-aminoethyl methacrylate. There can also be employed partially hydrolyzed polyacrylonitriles which are sufficiently hydrophilic.

Linear polymers (including both homo and copolymers) can be employed or there can also be employed cross-linked hydrophilic copolymers. Such cross-linked copolymers are frequently advantageously employed with the algicide containing polymers to insure more permanent adherence to the aquarium or the like.

Preferably, the cross-linking agent is present in an amount of 0.1 to 2.5 percent, most preferably not over 2.0 percent, although from 0.05 to 15 percent, or even 20 percent, of cross-linking agents can be used. Of course, care should be taken that cross-linking agents are not used in an amount which renders the product incapable of absorbing significant amounts of water, e.g., at least 20 percent of water.

Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl maleate, divinyl tartrate, triallyl melamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,4triacryltriazine triallyl phosphite, diallyl ester of benzene phosphonic acid, polyester of maleic anhydride with triethylene glycol, polyallyl glucose, e.g., triallyl glucose, polyallyl sucrose, e.g., pentaallyl sucrose, sucrose diacrylate, glucose dimethacrylate, pentaerythritol tetraacrylate, sorbitol dimethacrylate diallyl aconitate, divinyl citraconate, diallyl fumarate.

There can be included ethylenically unsaturated acids or salts thereof such as acrylic acid, cinnamic acid, crotonic acid, methacrylic acid, itaconic acid, aconitic acid, maleic acid, fumaric acid, mesaconic acid and citraconic acid. Also as previously indicated, there can be used partial esters such as mono 2-hydroxypropyl itaconate, mono 2-hydroxyethyl itaconate, mono 2-hydroxyethyl citraconate, mono 2-hydroxypropyl aconitate, mono 2hydroxyethyl maleate, mono-2-hydroxypropyl fumarate, monomethyl itaconate, monoethyl itaconate, mono Methyl Cellosolve ester of itaconic acid (Methyl Cellosolve is the monomethyl ether of diethylene glycol), Mono Methyl Cellosolve ester of maleic acid.

The polymers can be prepared as casting syrups, as aqueous dispersions, by aqueous suspension polymerization or as solutions in organic solvents such as ethyl alcohol, methyl alcohol, propyl alcohol, isopropyl alcohol, formamide, dimethyl sulfoxide or other appropriate solvent.

Polymerization can be carried out at 20° to 150° C., frequently 35° to 40° C. to 90° C. and can be completed after applying to the aquarium or other container. The polymerization can be carried out employing a free radical catalyst in the range of 0.05 to 1 percent of the polymerizable monomers. Typical catalysts include t-butyl peroctoate, benzoyl peroxide, isopropyl percarbonate, 2,4-dichlorobenzoyl peroxide, methyl ethyl ketone peroxide, cumene hydroperoxide and dicumyl peroxide. Irradiation, e.g., by ultraviolet light or gamma rays, also can be employed to catalyze the polymerization.

Typical examples of suitable polymers are set forth in examples A–G below. Unless otherwise indicated in the specification and claims, all parts and percentages are by weight.

EXAMPLE A

One thousand grams of silicone oil (polydimethyl siloxane), 100 grams of 2-hydroxyethyl methacrylate and 0.33 grams of isopropyl percarbonate were charged to a flask equipped with an agitator and heating mantle. The flask was rapidly agitated at 100° C. under a nitrogen atmosphere. After 15 minutes the slurry was filtered not to isolate the polymer. The polymer powder was reslurried in 300 ml. of xylene, filtered and dried. A 98 percent yield of 2 to 5 micron particle size alcohol soluble powder was obtained.

EXAMPLE B

Example A was repeated using xylene in place of the silicone oil and employing 300 grams of 2-hydroxyethyl methacrylate and the quantity of isopropyl percarbonate increased to 0.99 gram. An 85 percent yield of polymer beads was obtained.

EXAMPLE C

The procedure of example A was repeated replacing the 2-hydroxyethyl methacrylate by 100grams of 2-hydroxypropyl methacrylate to produce a thermoplastic solvent soluble hydrophilic finely divided bead polymer.

EXAMPLE D

Eight hundred grams of ethylene glycol monomethyl ether, 180 grams of 2-hydroxyethyl methacrylate, 20 grams of acrylic acid and 2 grams of t-butyl peroctoate were charged into a flask. The solution was heated and stirred under a carbon dioxide atmosphere for 6 hours. The product of this example while thermoplastic and solvent soluble has the capability of curing to cross-linked solvent insoluble polymer by further heating, particularly if additional catalyst is added.

EXAMPLE E

A casting syrup was made from 100 parts of 2-hydroxyethyl acrylate, 2-hydroxyethyl parts of ethylene glycol dimethacrylate and 0.4 parts t-butyl peroctoate.

EXAMPLE F

Ten kilograms of 2-hydroxyethyl methacrylate, 150 grams of ethylene glycol dimethacrylate and 4.0 grams of t-butyl peroctoate were heated with stirring for 50 minutes at 95° C. to yield a syrup having a viscosity of 420 centipoises at 30° C. To this syrup was added 20 grams of ethylene glycol dimethacrylate and 20 grams of t-butyl peroctoate and the syrup stirred until a homogeneous solution was obtained.

Similar results were obtained when replacing the ethylene glycol dimethacrylate by divinyl benzene.

EXAMPLE G

Seventy-five liters of ethanol, 1 kilogram of t-butylaminoethyl methacrylate, 1.5 kilograms of N-isopropyl acrylamide and 22.5 kilograms of hydroxyethyl methacrylate (containing 0.3 percent of ethylene glycol dimethacrylate) together with 100 grams of t-butyl peroctoate were charged into a vessel and the solution heated at 85° C. for 7 hours to effect polymerization to a 90 percent conversion level.

There can be incorporated with the hydrophilic polymers to provide coatings to prevent growth of algae any of the conventional inorganic or organic algicides including cuprous oxide, copper powder, mercuric oxide, cuprous oxide-mercuric oxide (e.g., 3:1 mercurous chloride), organotin compounds including triphenyltin chloride, triphenyltin bromide, tri p-cresyltin chloride, triethyltin chloride, tributyltin chloride, phenyl diethyltin fluoride, tri (p-chlorophenyltin) chloride, tri (m-chlorophenyltin) chloride, dibutyl ethyltin bromide, bis (tributyltin) sulfide, bis (triallyltin) sulfide, bis (tripropyltin) sulfide, dibutyloctyltin bromide, tricyclohexyltin chloride, triethyltin stearate, tributyltin fluoride, tributyltin fluoride, diphenyl ethyltin, chloride, diphenyl ethyltin fluoride, triphenyltin hydroxide, triphenyltin thiocyanate, triphenyltin trichloroacetate, tributyltin acetate, tributyltin neodecanoate, tributyltin neopentanoate, trioctyltin neodecanoate, tributyltin oxide, trioctyltin oxide, triphenyltin fluoride, tributyltin oleate, tripropyltin neodecanoate, tributyltin laurate, tributyltin octanoate, tributyltin dimethyl carbamate, tributyltin resinate, tributyltin chromate, amyldiethyltin neodecanoate, tributyltin naphthenate tributyltin isooctylmercaptoacetate, bis (tributyltin) oxalate, bis(tributyltin) malonate, bis (tributyltin) adipate, bis (tributyltin) carbonate, organo lead compounds, e.g., triphenyl lead acetate, triphenyl lead stearate, triphenyl lead neodecanoate, triphenyl lead oleate, triphenyl lead chloride, triphenyl lead laurate, triethyl lead oleate, triethyl lead acetate, triethyl lead stearate, trimethyl lead stearate, triphenyl lead bromide, triphenyl lead fluoride, organic compounds including 10,10 oxybisphenoxazine (SA-546), 1,2,3,-trichloro 4,6-dinitro benzene, hexachlorophene, phenol mercuric acetate, tetra chloroisophthalonitrile, bis (n-propylsulfonyl) ethylene, etc. Clear materials such as triphenyl lead chloride are preferred when coating a transparent wall.

The quantity of algicide required in the coating as would be expected varies to some extent with the particular agent used and the time of protection desired. In general, the amount of algicide employed will range from 2 to 80 percent of the resin, although as little as 0.1 percent of algicide can be used based on the resin. Usually 2 to 50 percent of algicide is used based on the resin.

The invention will be understood best in connection with the drawings wherein.

Figure 1:
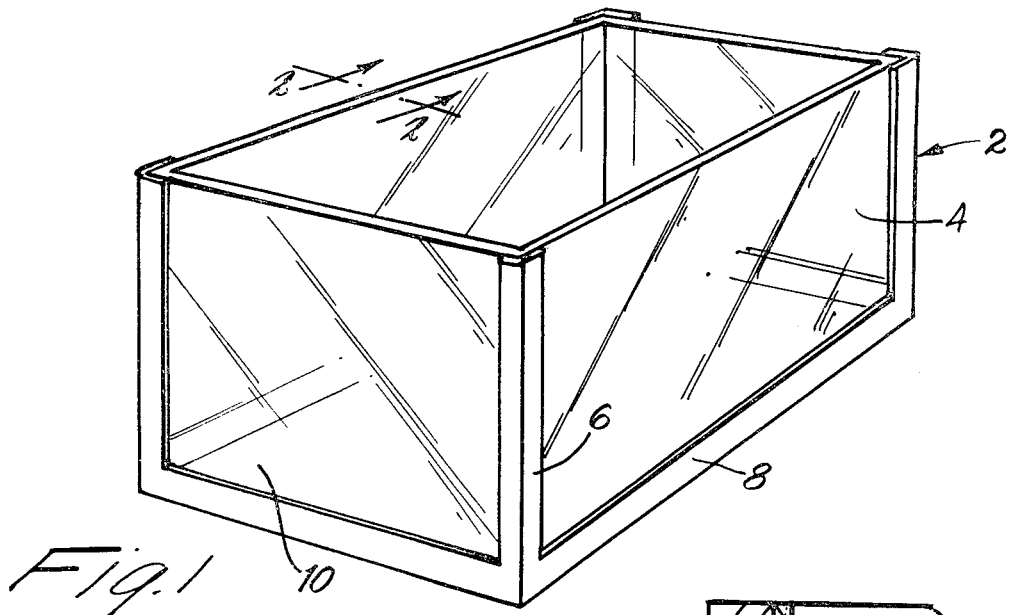
FIG. 1 illustrates an aquarium for fish treated according to the invention.
Figure 2:
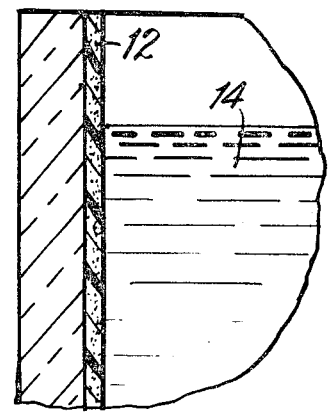
FIG. 2 is a sectional view taken along the line 2—2 of FIG. 1.
Figure 3:
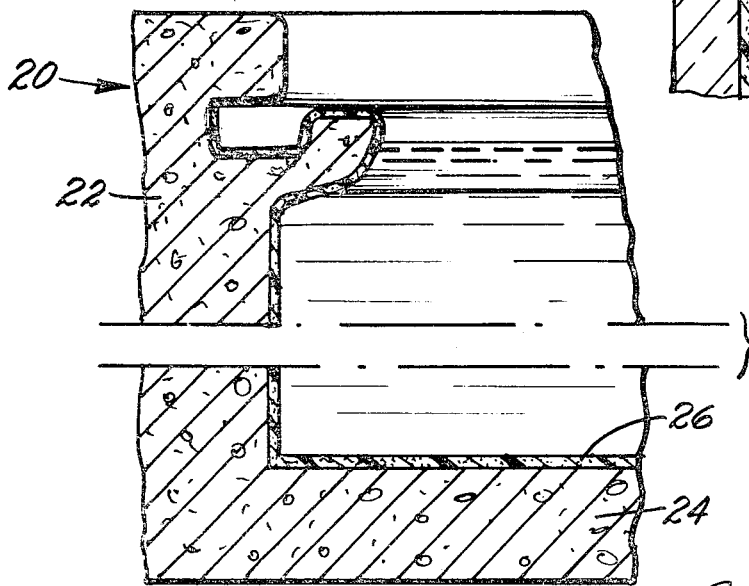

FIG. 3 is a fragmentary sectional view of a swimming pool or outdoor fishpond treated according to the invention. Referring more specifically to FIGS. 1 and 2 of the drawings, there is provided a conventional aquarium or fish tank 2 having transparent glass walls 4 held together by metal corner posts 6 and bottom rails 8. The aquarium has a conventional slate bottom 10. The tank has an inner coating 12 of Hydron (a hydrophilic, water-insoluble water-swellable sparingly cross-linked copolymer of hydroxyethyl methacrylate with less than 2 percent of ethylene glycol dimethacrylate) on the walls thereof. If desired, the bottom of the tank can also be so coated. While all of the glass walls are coated with the Hydron in FIG. 1 of the drawing, in some cases only one wall need be so coated, e.g., in a museum where only one transparent wall is exposed to view. The tank 2 is filled with water 14 and can contain any fresh or salt water fish such as sharks, catfish, tropical fish such as guppies, swordtails, glow-lites, head and tail lights, Sumatrian barbs, black mollies, red mollies, zebra fish, pearl danios angel fish or other aquatic animals such as eels, porpoises, swimming turtles, etc.

The rate of release of algicide is such that there is no adverse effect on the fish.

FIG. 3 shows a swimming pool 20 having a concrete wall 22 and concrete bottom 24 both of which have an inner coating 26 of the hydrophilic Hydron polymer.

The invention is further illustrated by the following examples.

EXAMPLE 1

One hundred of 2-hydroxyethyl methacrylate was mixed with 0.2 part ethylene glycol dimethacrylate and 20 parts of triphenyl lead chloride and 0.4 part of t-butyl peroctoate. The resulting viscous syrup was painted onto a glass wall of an aquarium and cured at 20° to 35° C. The resulting protective algicide coating was characterized by its ability to discourage algae growth prolonged underwater exposure of the aquarium even in the presence of continuous exposure to artificial light and sunlight.

EXAMPLE 2

The procedure of example 1 is repeated employing an isomeric mixture of hydroxy isopropyl methacrylates in place of the hydroxyethyl methacrylate.

EXAMPLE 3

To a glass-lined reactor was charged 800 pounds of ethanol, 200 pounds of hydroxyethyl methacrylate and 0.5 pounds of t-butyl peroctoate. The reactor was flushed with nitrogen and heated to 80° C. over a period of 1 hour The reactor was stirred at 80° C. for 7 hours, wherein 90 percent conversion of hydroxyethyl methacrylate to polymer was attained.

To the resulting solution, containing 18 percent polymer by weight there was added 2 percent by weight of tributyltin neodecanoate and the solution was applied to a concrete swimming pool to provide a coating about 1-mil thick. The solvent was allowed to evaporate.

EXAMPLE 4

Example 3 was repeated using 20 pounds of methyl methacrylate and 180 pounds of hydroxyethyl methacrylate as the monomer charge. A conversion of 95percent was attained in 7 hours. To the resulting solution there was added 10 pounds of tributyltin oxide and the solution was applied to the glass wall of an aquarium at a thickness of 0.5 mil and the solvent removed by gentle heating.

EXAMPLE 5

Example 3 was repeated using 80 pounds of methyl methacrylate and 120 pounds of hydroxyethyl methacrylate as the monomer charge. A conversion of 90 percent was attained in 6 hours. The resulting solution was used for the formulation of algicide coatings in a similar fashion to example 3.

EXAMPLE 6

Example 3 was repeated using a monomer charge of 40 pounds of hydroxypropyl acrylate and 160 pounds of hydroxyethyl methacrylate. A conversion of 85 percent was achieved after 7 hours. The procedure of example 3 was repeated using this solution but employing 15 pounds of triphenyltin acetate as the algicide. Similar results were obtained.

EXAMPLE 7

The procedure of example 6 was repeated replacing the hydroxypropyl acrylate by 40 pounds of acrylamide. Similar results were obtained.

While the coatings of the algicide containing hydrophilic polymer can be of almost any thickness, they usually are of 0.1 to 250 mils, preferably about 0.5 to 5 mils. This insures adequate algicide protection over long periods of time.

The hydrophilic polymer coating is preferably swellable in water to an extent of at least 20 percent in water to insure adequate contact of water in the aquarium or other container with the algicide and preferably does not absorb over 120 percent of its weight of water.

The hydrophilic polymer impregnated with algicide can be applied to the inner surface of the aquarium or the like in any convenient manner, e.g., as a casting syrup, by roller coating, brushing, etc. with or without a solvent. If a solvent is employed, it can be removed by evaporation at room temperature or with the aid of heat to leave the polymer as an adherent coating.

If a casting syrup is used, the polymerization can be completed on the glass or other tank surface.

Because the hydrophilic polymer coating is swellable an increased area of algicide is made available due to the water imbibed by the coating. This enhances the protection against the growth of algae, not only on the walls of the aquarium or other container, but even in the water disposed in the aquarium, thus keeping the water itself in clearer condition due to such imbibition and the slow release of algicide to the water.

What is claimed is:

1. In a container for water and aquatic life wall means including a transparent portion, mans for preventing the growth of algae for long periods of time when water is placed in said container; said algae growth-preventing means internally coating at least a portion of said transparent portion and comprising a transparent, hydrophilic, water-insoluble, water-swellable polymer impregnated with an algicide for viewing inside said container.

2. A container according to claim 1 which is an aquarium.

3. An aquarium according to claim 2 wherein the wall means includes a plurality of generally upright sides, at least one of which is transparent, said algicide impregnated hydrophilic polymer covering said transparent side.

4. An aquarium according to claim 3 which is rectangular in plan and has four generally upright, transparent sides, all of which have a coating of said algicide impregnated hydrophilic polymer.

5. An aquarium according to claim 2 wherein said polymer coating is a hydrophilic water insoluble, water swellable acrylic resin.

6. An aquarium according to claim 5 wherein said polymer is a polymer of a hydrophilic hydroxyalkyl or hydroxyalkoxyalkyl acrylate or methacrylate or acrylamide, alkyl acrylamide, methacrylamide, alkyl methacrylamide or diacetone acrylamide.

7. An aquarium according to claim 6 wherein the coating comprises a polymer of hydroxyethyl acrylate, hydroxypropyl acrylate, hydroxyethyl methacrylate or hydroxypropyl methacrylate.

8. A container according to claim 2 having water therein and adapted to contain fish in the water.

9. A container according to claim 1 wherein said algae growth-preventing means covers the entire internal surface of the transparent portion of the wall means.